(12) United States Patent
Cronin et al.

(10) Patent No.: US 11,822,561 B1
(45) Date of Patent: Nov. 21, 2023

(54) SYSTEM AND METHOD FOR OPTIMIZING EVIDENCE OF USE ANALYSES

(71) Applicant: ipCapital Group, Inc, Williston, VT (US)

(72) Inventors: John Cronin, Jericho, VT (US); Kennyn Don Statler, Essex Jct, VT (US); Nathan Doudera, Burlington, VT (US); Michael D'Andrea, Williston, VT (US); Joseph Bodkin, So. Burlington, VT (US); Harrison Grant, Anaheim, CA (US)

(73) Assignee: ipCapital Group, Inc, Williston, VT (US)

( * ) Notice: Subject to any disclaimer, the term of this patent is extended or adjusted under 35 U.S.C. 154(b) by 0 days.

(21) Appl. No.: 17/469,667

(22) Filed: Sep. 8, 2021

Related U.S. Application Data

(60) Provisional application No. 63/075,619, filed on Sep. 8, 2020.

(51) Int. Cl.
*G06F 16/2457* (2019.01)

(52) U.S. Cl.
CPC .............. *G06F 16/24578* (2019.01)

(58) Field of Classification Search
CPC ................................ G06F 16/24578
See application file for complete search history.

(56) References Cited

U.S. PATENT DOCUMENTS

| | | | |
|---|---|---|---|
| 6,556,992 B1 | 4/2003 | Barney et al. | |
| 8,938,463 B1 | 1/2015 | Kim et al. | |
| 2006/0200396 A1 | 9/2006 | Satterfield et al. | |
| 2007/0214112 A1* | 9/2007 | Towers | G06F 16/338 |
| 2007/0255744 A1 | 11/2007 | Gideoni et al. | |
| 2008/0154848 A1* | 6/2008 | Haslam | G06F 16/382 |
| 2009/0171907 A1* | 7/2009 | Radovanovic | G06F 16/951 |
| 2010/0058415 A1 | 3/2010 | Georgen et al. | |
| 2010/0114859 A1* | 5/2010 | Li | G06F 16/345 |
| | | | 707/E17.014 |
| 2011/0055207 A1* | 3/2011 | Schorzman | G06F 16/13 |
| | | | 707/723 |
| 2012/0016741 A1 | 1/2012 | Brunsman et al. | |
| 2012/0158400 A1* | 6/2012 | Schmidt | G06F 40/30 |
| | | | 704/9 |
| 2013/0086080 A1 | 4/2013 | Lundberg | |
| 2013/0086094 A1 | 4/2013 | Lundberg | |
| 2014/0279584 A1 | 9/2014 | Lee et al. | |
| 2014/0289675 A1 | 9/2014 | Stading et al. | |

(Continued)

OTHER PUBLICATIONS

U.S. Appl. No. 17/469,810, John Cronin, System and Method for Validating Evidence of Use, filed Sep. 8, 2021.

(Continued)

*Primary Examiner* — Jay A Morrison
(74) *Attorney, Agent, or Firm* — Polsinelli LLP

(57) ABSTRACT

A method of optimizing an EOU search by increasing the number of sources searched by a predetermined variable and notifying the user of the optimal search results. For example, the EOU tool may search 5-20 pages in 5 page increments and compare the results of the various searches to determine which one provides the best results. Based on the results of the searches the EOU tool can send a notification to the user such as "increasing the search results by 10 pages will improve EOU results".

17 Claims, 3 Drawing Sheets

Content - High Level Diagram

(56) References Cited

U.S. PATENT DOCUMENTS

| | | | |
|---|---|---|---|
| 2016/0125035 A1* | 5/2016 | Hanson | G06F 16/24575 707/722 |
| 2016/0148327 A1 | 5/2016 | Buchholz | |
| 2016/0350886 A1 | 12/2016 | Jessen et al. | |
| 2016/0352805 A1* | 12/2016 | Seida | G06Q 50/265 |
| 2017/0011029 A1 | 1/2017 | Chatterjee et al. | |
| 2018/0018564 A1* | 1/2018 | Erenrich | G06F 16/3334 |
| 2018/0189909 A1 | 7/2018 | Zellner et al. | |
| 2018/0196870 A1 | 7/2018 | Mukherjee | |
| 2019/0121868 A1 | 4/2019 | Dunne et al. | |
| 2021/0157856 A1* | 5/2021 | Tsuzuku | G06F 16/355 |
| 2021/0264115 A1 | 8/2021 | Wang et al. | |
| 2022/0004545 A1 | 1/2022 | Arvela et al. | |
| 2022/0180317 A1 | 6/2022 | Andrews | |

OTHER PUBLICATIONS

U.S. Appl. No. 17/469,650, John Cronin, System and Method for Validating Evidence of Use, filed Sep. 8, 2021.

U.S. Appl. No. 17/469,658, John Cronin, System and Method for Rule Based Notifications of Use, filed Sep. 8, 2021.

U.S. Appl. No. 17/469,663, John Cronin, System and Method for Parsing Claim Elements to Create an EOU Score and Associated Rules, filed Sep. 8, 2021.

U.S. Appl. No. 17/469,677, John Cronin, System and Method for Use Based Valuation, filed Sep. 8, 2021.

U.S. Appl. No. 17/469,658; Office Action dated Jul. 22, 2022.

U.S. Appl. No. 17/469,663; Office Action dated Aug. 19, 2022.

U.S. Appl. No. 17/469,663—Final Office Action dated Jun. 27, 2023 (56 pages).

U.S. Appl. No. 17/469,658—Final Office Action dated Apr. 5, 2023 (47 pages).

U.S. Appl. No. 17/469,810; Office Action dated Sep. 19, 2023.

U.S. Appl. No. 17/469,650; Office Action dated Sep. 1, 2023.

U.S. Appl. No. 17/469,658; Office Action dated Aug. 30, 2023.

U.S. Appl. No. 17/469,663; Final Office Action dated Sep. 13, 2023.

U.S. Appl. No. 17/469,677; Office Action dated Aug. 17, 2023.

* cited by examiner

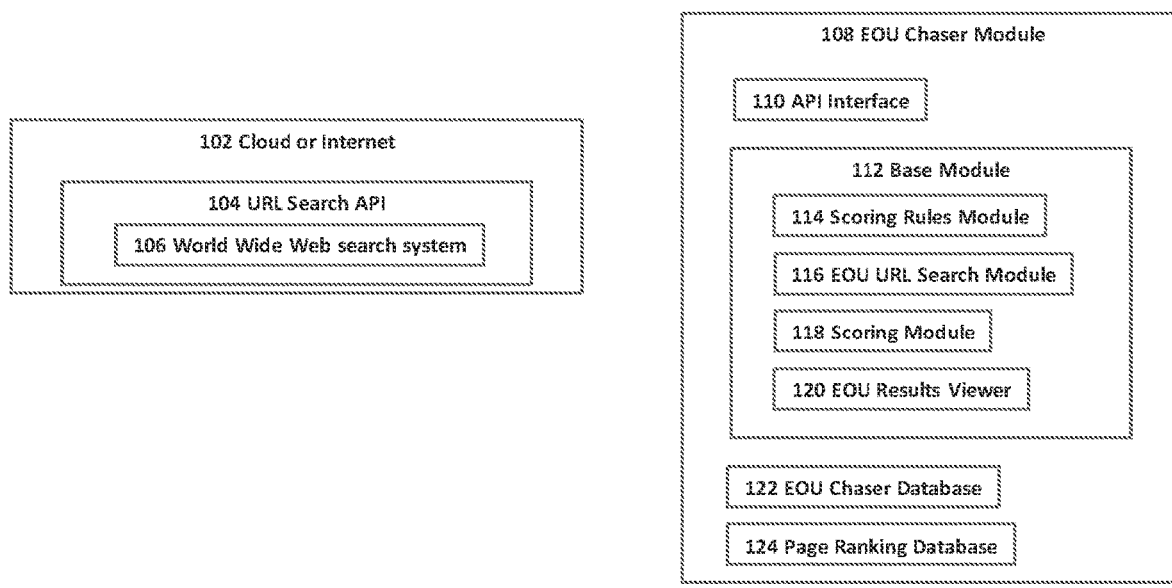
Fig.1 Content - High Level Diagram

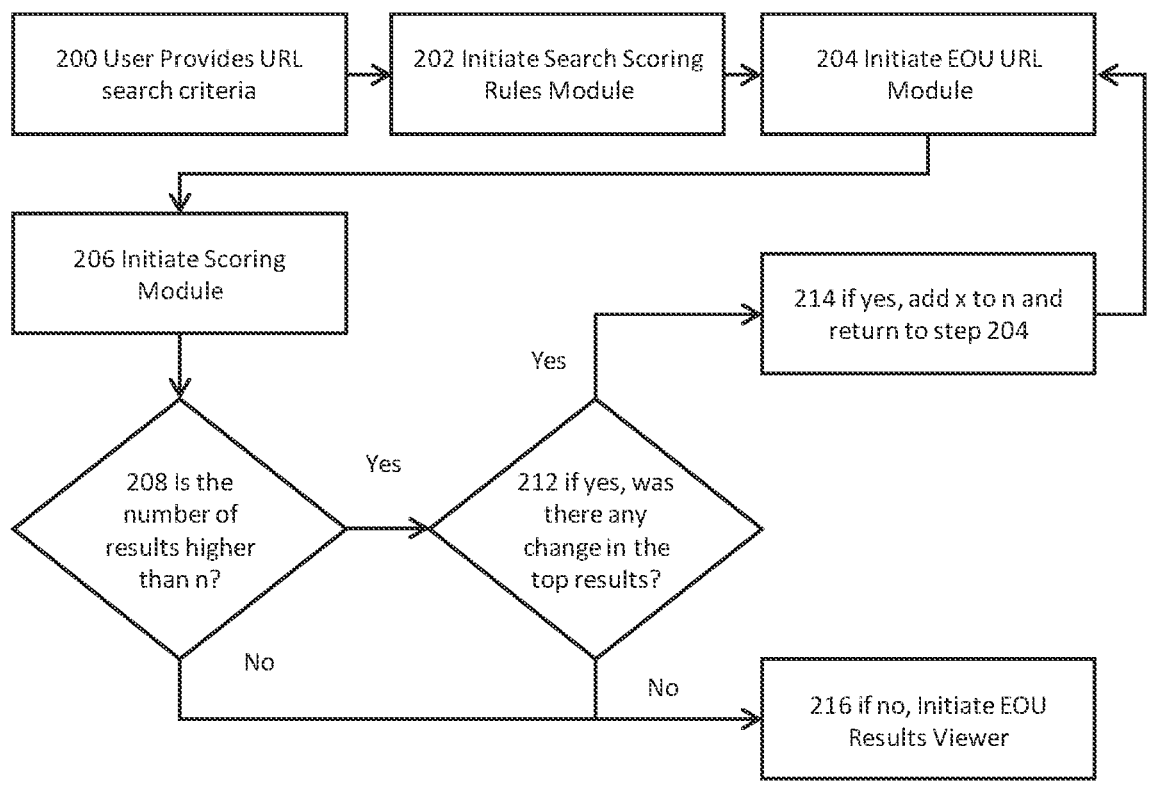
Fig.2 Base Module Object Content

| N = 50 | | N = 100 | |
|---|---|---|---|
| Page Rank Database | | Page Rank Database | |
| Rank | URL | Rank | URL |
| 1 | www.infringement.com | 1 | www.infringement.com |
| 2 | www.example.com | 2 | www.example.com |
| 3 | www.hyperlink.com | 3 | www.xyz.com |
| 4 | www.xyz.com | 4 | www.hyperlink.com |
| 5 | www.youtube.com/watch?v=dQw4w9WgXcQ | 5 | www.newnumberfive.com |
| ... | ... | ... | ... |
| 10 | www.last.com | 10 | www.last.com |
| N = 150 | | Example of Initialized Database | |
| Page Rank Database | | | |
| Rank | URL | Page Rank Database | |
| 1 | www.infringement.com | 1 | null |
| 2 | www.example.com | 2 | null |
| 3 | www.xyz.com | 3 | null |
| 4 | www.hyperlink.com | 4 | null |
| 5 | www.newnumberfive.com | 5 | null |
| ... | ... | ... | ... |
| 10 | www.last.com | 10 | null |

Fig.3 Page Ranking Database Data Content

SYSTEM AND METHOD FOR OPTIMIZING EVIDENCE OF USE ANALYSES

CROSS-REFERENCE TO RELATED APPLICATIONS

The present application claims priority benefit to U.S. provisional patent application 63/075,619, filed on Sep. 8, 2020, the disclosure of which is incorporated by reference herein.

BACKGROUND

Field of the Disclosure:

The present disclosure is generally related to optimizing an evidence of use search for a patent.

Description of the Related Art:

The total amount of data online is estimated at 1.2 exabytes. If a search returns even one millionth of that data, the amount of data returned is still 1200 gigabytes. Even though computers are much faster than humans at scanning information, limitations in computer processing speed and internet connection speed still inhibit the speed of an evidence of use (EOU) search.

Another problem with EOU searches is that many results are repetitive, redundant, or completely irrelevant and it would be a waste of resources to scan many documents in their entirety.

Since most search engines already sort based on relevance, initial batches of results have a lower chance of containing relevant results than later batches of documents identified in a search. What are needed are improved methods and systems that identify when to stop a search.

SUMMARY OF THE PRESENTLY CLAIMED INVENTION

The present disclosure is directed to searching and ranking publications. In an embodiment, a method of the presently claimed invention may include the steps of receiving a rule for ranking documents of a plurality of documents identified in a search, the rule identifying a criteria for ending the search and comparing content included in a patent specification with content of each document of the set of documents. This method may also include ranking at least a subset of the documents of the plurality of documents according to the rule, ending the search based on identifying that the criteria for ending the search has been met, and sorting the subset of the documents based on the ranking.

BRIEF DESCRIPTIONS OF THE DRAWINGS

FIG. 1: Illustrates an EOU Search Optimization System, according to an embodiment.

FIG. 2: Illustrates a Base Module, according to an embodiment.

FIG. 3: Illustrates a Page Ranking Database, according to an embodiment.

DETAILED DESCRIPTION

The present disclosure is directed to methods and systems for optimizing evidence of use (EOU) searches. Methods consistent with the present disclosure may identify when an EOU search should be ended based on a calculation associated with customized criteria. This system comprises of a cloud or communication network that may be a wired and/or a wireless network. The communication network, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art. The communication network may allow ubiquitous access to shared pools of configurable system resources and higher-level services that can be rapidly provisioned with minimal management effort, often over Internet and relies on sharing of resources to achieve coherence and economies of scale, like a public utility, while third-party clouds enable organizations to focus on their core businesses instead of expending resources on computer infrastructure and maintenance, at step 102. An API or application programming interface is a set of subroutine definitions, communication protocols, and tools for building software. In general terms, it is a set of clearly defined methods of communication among various components. An API makes it easier to develop a computer program by providing all the building blocks, which are then put together by the programmer. An API may be for a web-based system, operating system, database system, computer hardware, or software library. An API specification can take many forms, but often includes specifications for routines, data structures, object classes, variables, or remote calls. POSIX, Windows API and ASPI are examples of different forms of APIs, at step 104. A world wide web search system is a web search engine, where the order of search results, in part, on a priority rank system called "PageRank". The world wide web search system also provides many different options for customized search, using symbols to include, exclude, specify or require certain search behavior, and offers specialized interactive experiences, such as flight status and package tracking, weather forecasts, currency, unit and time conversions, word definitions, and more. The main world wide web search system purpose is to hunt for text in publicly accessible documents offered by web servers, as opposed to other data, such as images or data contained in databases. Today, world wide web search engines have begun to rely on deep neural networks. Companies such as, Google, Baidu, Soso.com, Naver.com, Daum.net, Yandex, Seznam.cz, Yahoo, Bing and DuckDuckGo are examples of world wide web search system, at step 106. An EOU Chaser Module which provides an Artificial intelligence based software module, or "EOU Chaser", that can provide routine updates of evidence of use or EOU. Further, the EOU chaser can provide a way to improve the EOU process by robustly documenting and setting up for tracking, the logic and assumptions of the EOU analysis. Further, the EOU chaser allows for instant updates, and the updates can be run and can alert the patent owner when a significant EOU result has changed. Further, the EOU chaser can quantify the EOU results in a much more standard form. Further, the EOU chaser can provide indications of a "weighting" about the "level" or "closeness" of the EOU. Finally, the EOU chaser can be "tuned" to highest performance based combining the skills of the EOU expert and the skill of expert predefined search guidelines and rules, at step 108. An API Interface which allows a user to access the URL Search API, at step 110. A Base Module which initiates the Scoring Rules Module, the EOU URL Module, the Scoring Module, and the EOU Results Viewer, at step 112. A Scoring Rules Module which allows the user to enter scoring rules criteria, in another embodiment the scoring rules are generated automatically from the URL search criteria, in another embodiment the scoring rules are generated automatically using natural language processing and a document submitted by the user, at step 114. An EOU URL Search Module which performs the search through the API, gathers and collects the relevant data, and adds a time stamp of when the search was performed, at step 116. A Scoring Module which applies the scoring rules to the search results and stores the scores in the EOU Chaser Database, at step 118. An EOU Results Viewer which contains the data collected from the search through the API Interface as well as displays the scores determined from the scoring rules. This viewer is displayed to the user for them to determine a level of evidence of use for a searched product or patent. The viewer contains the URL, title, summary, and time stamp of the relevant data gathered in the EOU URL Search Module, and the corresponding score from the Scoring Module, at step 120. An EOU Chaser Database which contains the URL, Title, and Summary of each URL obtained from the search performed in the EOU URL Search Module, the corresponding scores from the Scoring Module, and a time stamp of when the search was performed. The EOU Chaser Database also contains the scoring rules inputted by the user in the Scoring Rules Module, at step 122. A Page Ranking Database which contains the search results sorted by rank based on their score from the Scoring Module, at step 124.

Functioning of the "Base Module" will now be explained with reference to FIG. 2. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

This figure displays the "Base Module". The process begins with the user providing the URL search criteria, at step 200. The Base Module initiates the Scoring Rules Module, which allows the user to enter scoring rules, in another embodiment the Scoring Rules Module generates scoring rules automatically, at step 202. The Base Module initiates the EOU URL Search Module which performs the search through the API, collects the results, adds a time stamp of when the search was performed, and stores the first n results in the EOU Chaser Database, in another embodiment the EOU URL Search Module stores more than the first n results in the EOU Chaser Database, where n is some integer, at step 204. The Base Module initiates the Scoring Module which applies the scoring rules to the first n search results, in another embodiment the Scoring Module is initiated by the EOU URL Module, the Scoring Module then sorts the results from highest score to lowest score and stores the top y results in the Page Ranking Database, where y is some integer, in another embodiment all the results and scores are recorded in the Page Ranking Database, at step 206. The Base Module determines if the number of URLs obtained from the EOU URL Search is greater than n, at step 208. If the number of URLs is lower than n, then the EOU URL Module has reached the end of the search results, the search ends, and the Base Module initiates the EOU Results Viewer, at step 210. If the number of URLs is higher than n, the Base Module determines if the top y URLs in the Page Ranking Database changed, at step 212. If the URLs in the Page Ranking Database changed, then the Base Module adds x to n, then the Base Module returns to step 204, in another embodiment the Base Module requests the next x results from the EOU Chaser Database to be scored by the Scoring Module, where x is some integer, at step 214. If there was no change in the Page Ranking Database, the Base Module initiates the EOU Results Viewer which contains the data collected from the search through the API Interface as well as displays the scores determined from the scoring rules. This viewer is displayed to the user for them to determine a level of evidence of use for a searched product or patent. The viewer contains the URL, Title, Summary and time stamp of the relevant data gathered in the EOU URL Search Module, in another embodiment the results are sorted by score, at step 216.

Functioning of the "Page Ranking Database" will now be explained with reference to FIG. 3. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

This figure displays the "Page Ranking Database". The Database contains the results from the EOU URL Module and the associated scores from the Scoring Module, in another embodiment the data is initialized to null by the Base Module, in FIG. 600.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

What is claimed is:

1. A method for searching publications, the method comprising:
   receiving a document submitted by a user device and one or more uniform resource locator (URL) search criteria of an associated URL, wherein each URL is associated with a corresponding application programming interface (API);
   conducting an online search based on the URL using the corresponding API, the online search identifying one or more online search results;
   automatically generating a rule for ranking the online search results identified in the online search based on the received documents and the URL search criteria, wherein the URL search criteria includes criteria for ending the online search;
   assigning a score to each URL in a subset of the online search results based on the automatically generated rule wherein the score is presented in a custom viewer display;

ranking at least the subset of the online search results identified in the online search according to the rule and the assigned score;

ending the online search based on identifying that the criteria for ending the online search in accordance with the rule has been met by a number of URLs corresponding to the subset of the online search results; and generating an updated custom viewer display for the user device that presents the subset of the online search results in sorted order based on the ranking.

2. The method of claim 1, wherein the submitted document includes a patent specification, and further comprising comparing content included in the patent specification with content of each of the online search results based on natural language processing.

3. The method of claim 1, wherein the custom viewer display includes a respective URL for each of the subset of the online search results.

4. The method of claim 1, further comprising tracking a timestamp associated with each of the online searches, and wherein the custom viewer display includes the timestamp for each of the subset of the online search results.

5. The method of claim 1, further comprising storing a summary of each of the online searches, and wherein the custom viewer display includes the summary for each of the subset of the online search results.

6. The method of claim 1, wherein conducting the online search includes:

identifying a change to URLs associated with the at least one subset of the online search results;

requesting another subset of the online search results; and updating the custom viewer display based on the other subset of the online search results.

7. The method of claim 1, wherein ranking the subset of the online search results includes ranking the online search results, and identifying the subset as being highest ranked among other subsets.

8. The method of claim 1, further comprising detecting a change to one of the online search results, and generating a notification to a designated user device.

9. A non-transitory, computer-readable storage medium having embodied thereon a program executable by a processor to perform a method for searching publications, the method comprising:

receiving a document submitted by a user device and one or more uniform resource locator (URL) search criteria of an associated URL, wherein each URL associated with a corresponding application programming interface (API);

conducting an online search based on the URL using the corresponding API, the online search identifying one or more online search results;

automatically generating a rule for ranking the online search results identified in the online search based on the received documents and the URL search criteria , wherein the URL search criteria includes criteria for ending the online search;

assigning a score to each URL in a subset of the online search results based on the automatically generated rule, wherein the score is presented in a custom viewer display;

ranking at least the subset of the online search results identified in the online search according to the rule and the assigned core;

ending the online search based on identifying that the criteria for ending the online search in accordance with the rule has been met by a number of URLs corresponding to the subset of the online search results; and generating an updated custom viewer display for the user device that presents the subset of the online search results in sorted order based on the ranking.

10. The non-transitory, computer-readable storage medium of claim 9, wherein the submitted document includes a patent specification, and further comprising comparing content included in the patent specification with content of each of the online search results based on natural language processing.

11. The non-transitory, computer-readable storage medium of claim 9, wherein the custom viewer display includes a respective URL for each of the subset of the online search results.

12. The non-transitory, computer-readable storage medium of claim 9, further comprising instructions executable to assign a score to each of the online search results based on the rule, wherein the score is presented in the custom viewer display.

13. The non-transitory, computer-readable storage medium of claim 9, further comprising instructions executable to track a timestamp associated with each of the online searches, and wherein the custom viewer display includes the timestamp for each of the subset of the online search results.

14. The non-transitory, computer-readable storage medium of claim 9, further comprising instructions executable to store a summary of each of the online searches, and wherein the custom viewer display includes the summary for each of the subset of the online search results.

15. The non-transitory, computer-readable storage medium of claim 9, wherein conducting the online search includes:

identifying a change to URLs associated with the at least one subset of the online search results;

requesting another subset of the online search results; and updating the custom viewer display based on the other subset of the online search results.

16. The non-transitory, computer-readable storage medium of claim 9, wherein ranking the subset of the online search results includes ranking the online search results, and identifying the subset as being highest ranked among other subsets.

17. The non-transitory, computer-readable storage medium of claim 9, further comprising detecting a change to one of the online search results, and generating a notification to a designated user device.

* * * * *